(12) United States Patent
Remond et al.

(10) Patent No.: US 10,738,849 B2
(45) Date of Patent: Aug. 11, 2020

(54) PERFORATED HEAT SCREEN FOR A BRAKED AIRCRAFT WHEEL

(71) Applicant: SAFRAN LANDING SYSTEMS, Velizy Villacoublay (FR)

(72) Inventors: Sébastien Remond, Velizy-Villacoublay (FR); Jeoffrey Choplin, Velizy-Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 15/652,342

(22) Filed: Jul. 18, 2017

(65) Prior Publication Data
US 2018/0023647 A1 Jan. 25, 2018

(30) Foreign Application Priority Data
Jul. 19, 2016 (FR) ...................................... 16 56865

(51) Int. Cl.
*F16D 65/84* (2006.01)
*F16D 65/78* (2006.01)
*F16D 65/847* (2006.01)
*B64C 25/42* (2006.01)

(52) U.S. Cl.
CPC ............ *F16D 65/847* (2013.01); *B64C 25/42* (2013.01); *F16D 2065/785* (2013.01)

(58) Field of Classification Search
CPC ........ F16D 65/847; F16D 65/84; F16D 65/78; F16D 2065/785; F16D 2065/788; F16D 2065/789
USPC ..................................................... 188/264 R
See application file for complete search history.

(56) References Cited

U.S. PATENT DOCUMENTS

| | | | | |
|---|---|---|---|---|
| 1,922,318 A | * | 8/1933 | Mulder ................. | F16D 65/827 188/18 R |
| 2,181,008 A | * | 11/1939 | Bonzack ............... | F16D 65/827 188/264 R |
| 3,023,858 A | * | 3/1962 | Yocom ................... | F16D 65/08 188/264 R |
| 3,251,437 A | * | 5/1966 | Moyer ................... | F16D 55/40 188/264 AA |

(Continued)

FOREIGN PATENT DOCUMENTS

EP 0 555 822 A1 8/1993
FR 2 785 345 A1 5/2000

(Continued)

OTHER PUBLICATIONS

Search Report of French Application No. 16 56865 dated Mar. 7, 2017.

*Primary Examiner* — Thomas J Williams
*Assistant Examiner* — James K Hsiao
(74) *Attorney, Agent, or Firm* — Sughrue Mion, PLLC

(57) ABSTRACT

The invention provides a method of reducing the cooling time for disks of a brake (5) of an aircraft wheel (1) fitted with a heat screen (10) extending between the wheel and the disks of the brake, and mounted to rotate on aircraft landing gear about an axis of rotation, the method comprising making perforations (11, 12, 13) through the heat screen to allow air heated by the disks to pass through the heat screen towards the wheel, the perforations being provided with obstacles to block any radiation from passing directly from the disks towards the wheel.

10 Claims, 3 Drawing Sheets

(56) References Cited

U.S. PATENT DOCUMENTS

| | | | | |
|---|---|---|---|---|
| 3,728,039 A * | 4/1973 | Plemmons | | B60Q 1/38 165/908 |
| 4,004,056 A * | 1/1977 | Carroll | | F23M 5/085 416/231 R |
| 4,017,123 A * | 4/1977 | Horner | | B60C 23/18 188/264 G |
| 4,674,606 A * | 6/1987 | Denton | | F16D 65/10 188/264 R |
| 4,856,619 A * | 8/1989 | Petersen | | B60C 23/18 188/18 A |
| 5,002,342 A * | 3/1991 | Dyko | | B60C 23/18 188/264 G |
| 5,107,968 A * | 4/1992 | Delpassand | | B60C 23/18 188/264 G |
| 5,248,013 A * | 9/1993 | Hogue | | F16D 55/36 188/264 G |
| 5,605,046 A * | 2/1997 | Liang | | F01D 5/183 60/266 |
| 5,851,056 A * | 12/1998 | Hyde | | B60B 19/10 301/6.91 |
| 5,855,112 A * | 1/1999 | Bannai | | F02C 3/05 60/39.511 |
| 6,155,650 A * | 12/2000 | Barger | | F16D 65/847 188/218 A |
| 6,935,835 B2 * | 8/2005 | Della Mora | | F04D 29/422 415/119 |
| 7,051,845 B2 * | 5/2006 | Thorp | | F16D 55/36 188/71.6 |
| 7,255,208 B2 * | 8/2007 | Rea | | F16D 65/847 188/264 G |
| 9,017,462 B2 * | 4/2015 | Gelb | | B01D 46/521 55/385.3 |
| 2004/0146399 A1 * | 7/2004 | Bolms | | F01D 25/12 415/175 |
| 2005/0224634 A1 * | 10/2005 | Rea | | F16D 65/847 244/10 |
| 2008/0121475 A1 * | 5/2008 | Bhaskara | | F16D 65/847 188/264 CC |
| 2010/0025172 A1 * | 2/2010 | Campbell | | F16D 65/12 188/264 AA |
| 2011/0259684 A1 * | 10/2011 | Kokott | | F16D 65/128 188/218 XL |
| 2012/0241557 A1 * | 9/2012 | Coty | | F16D 55/40 244/100 R |
| 2012/0260662 A1 * | 10/2012 | Nash | | F02C 7/08 60/772 |
| 2015/0144441 A1 * | 5/2015 | Kuo | | F16D 65/847 188/218 XL |
| 2016/0084328 A1 * | 3/2016 | Elliot | | F16D 65/0025 188/218 A |

FOREIGN PATENT DOCUMENTS

| | | |
|---|---|---|
| FR | 2 990 188 A1 | 11/2013 |
| GB | 2513331 A | 10/2014 |

\* cited by examiner ial direction (the axial direc-
PERFORATED HEAT SCREEN FOR A BRAKED AIRCRAFT WHEEL The invention relates to a method of limiting the cooling time for disks of an aircraft wheel brake, and to an aircraft wheel heat screen constituting an application of the method.

BACKGROUND OF THE INVENTION

Certain aircraft wheels are associated with a brake comprising a stack of disks housed at least in part inside the wheel. It is known to place a heat screen between the disks and the wheel so as to protect the wheel and its tire from radiation from the hot disks. In particular, it is important to avoid any zones of the wheel that are in contact with the tire reaching a temperature higher than 200 degrees Celsius.

Nevertheless, such screens do not enable the heat accumulated in the brake during landing and during taxiing of the aircraft from the runway to a terminal. It turns out that the temperature of the brake is a criterion having a major influence on the aircraft. For example, takeoffs are authorized only if the temperature of the brake is less than 400 degrees. Unfortunately, it takes the brake a certain amount of time to cool, which can prevent the aircraft taking off again quickly after it has stopped at the terminal.

Various means have been proposed to reduce this cooling time, in particular by using a cooling fan. Nevertheless, such equipment is not used by all airlines.

OBJECT OF THE INVENTION

The invention seeks to propose a method for reducing the time required for cooling the disks of an aircraft wheel brake that makes it possible to improve operating conditions for the aircraft.

SUMMARY OF THE INVENTION

In order to achieve this object, there is provided a method of reducing the cooling time for disks of a brake of an aircraft wheel fitted with a heat screen extending between the wheel and the disks of the brake, and mounted to rotate on aircraft landing gear about an axis of rotation, the method comprising making perforations through the heat screen to allow air heated by the disks to pass through the heat screen towards the wheel, the perforations being provided with obstacles to block any radiation from passing directly from the disks towards the wheel.

Thus, the perforations enable a convective stream to be set up through the perforations, thereby facilitating discharge of the heat produced by the brake disks. The air heated by the disks can thus escape more quickly to the outside without having to go round the heat screen via its end deepest inside the wheel.

The presence of obstacles nevertheless prevents radiation from the disks impacting against the wheel directly, which would contribute to heating it quickly.

BRIEF DESCRIPTION OF THE DRAWINGS

The invention can be better understood in the light of the following description of non-limiting embodiments of the invention given with reference to the figures of the accompanying drawings, in which.

DETAILED DESCRIPTION OF THE INVENTION

Figure 1:
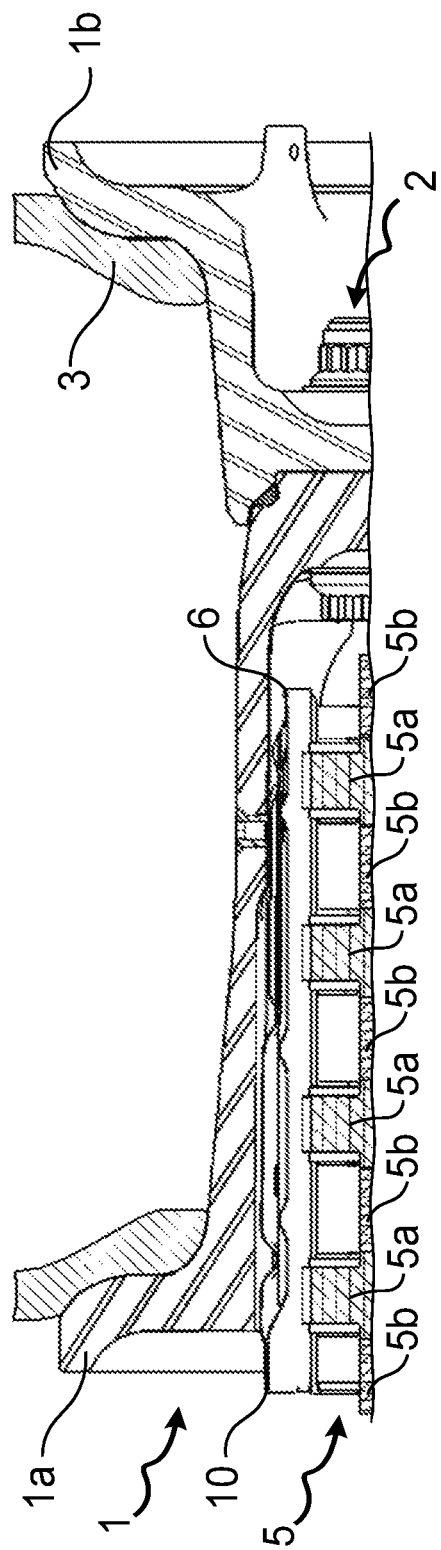
FIG. 1 is a fragmentary section view of an aircraft wheel fitted with a brake and provided with a heat screen.

With reference to FIG. 1, the invention applies to an aircraft wheel 1, in this example comprising two half-wheels 1a and 1b that are connected together by bolts 2 in order to carry a tire 3. The wheel is provided with bearings (not shown) for mounting it to rotate on an axle of aircraft landing gear, about an axis of rotation that is substantially horizontal. The half-wheel 1a is hollow and receives the disks of a brake 5, having rotor disks 5a that are driven in rotation about the axis of rotation of the wheel by bars 6 that are formed in the half-wheel 1a, and stator disks 5b that are engaged on a torque take-up tube of the brake (not shown), which prevents them from rotating. A heat screen 10 made up in this example of a plurality of petals, each extending between two bars 6, is arranged between the rim of the wheel 1 and the disks 5a, 5b in order to protect the wheel from radiation from the hot disks. This well known and is recalled merely to situate the invention.

In the invention, the heat screen 10 is provided with perforations enabling air heated by the disks to pass through the shield in order to be discharged to the outside, while preventing direct radiation going from the disks to the wheel. In the figures below, the convective stream is represented by thick arrows, while radiation is represented by fine arrows.

Figure 2:
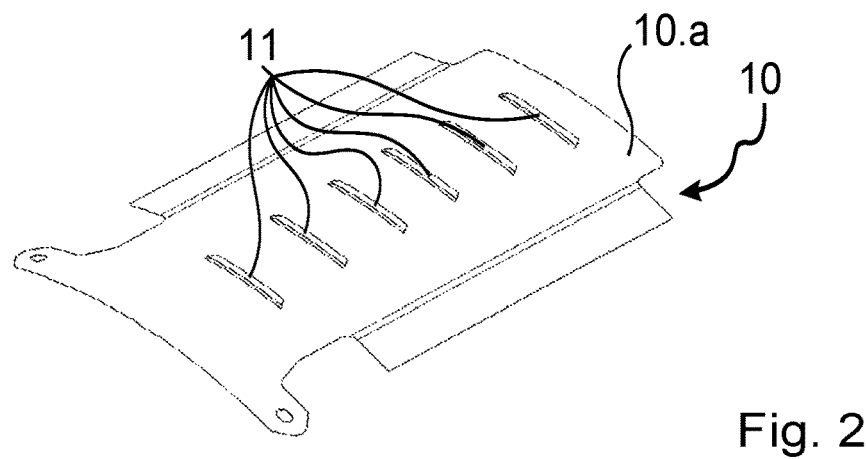
FIG. 2 is a perspective view of one petal of the heat screen provided with perforations in a first embodiment of the invention.
Figure 3:
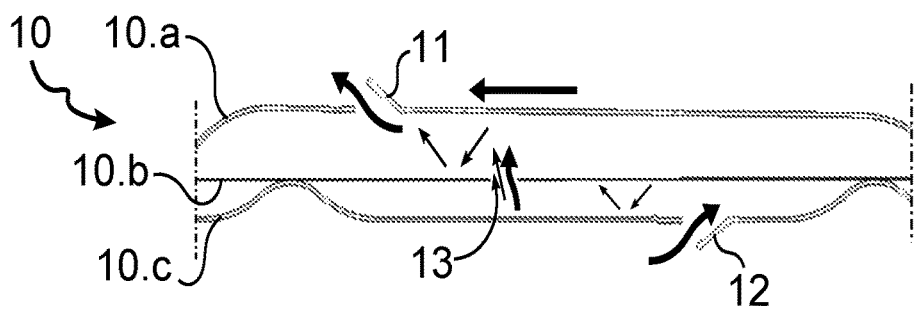
FIG. 3 is a longitudinal section view of the heat screen petal of FIG. 2.

In a first embodiment of the invention shown in FIG. 2, each petal of the heat screen 10 is made from three superposed sheets 10a, 10b, and 10c with only the outer sheet 10a being visible in FIG. 2 with scoops 11 extending in a direction perpendicular to an axial direction (the axial direction being the direction parallel to the axis of rotation of the wheel). In FIG. 3, it can be seen that the scoops 11 on the outer sheet 10a are associated with similar scoops 12 that are oriented in the opposite direction and made in the inner sheet 10c, while being mutually offset, so that two associated scoops are not in register with each other. Orifices 13 are made in the intermediate sheet 10b between the scoops 11 and 12 in order to allow air to pass through the screen. The perforation in the heat screen enables a convective stream of air heated by the disks to be set up through the heat screen, with the offset between the scoops enabling the intermediate sheet to form an obstacle blocking radiation from passing directly from the disks to the wheel. Indirect radiation that has been subjected to multiple reflections, and that is thus necessarily attenuated, may nevertheless pass through the perforations.

Figure 4:
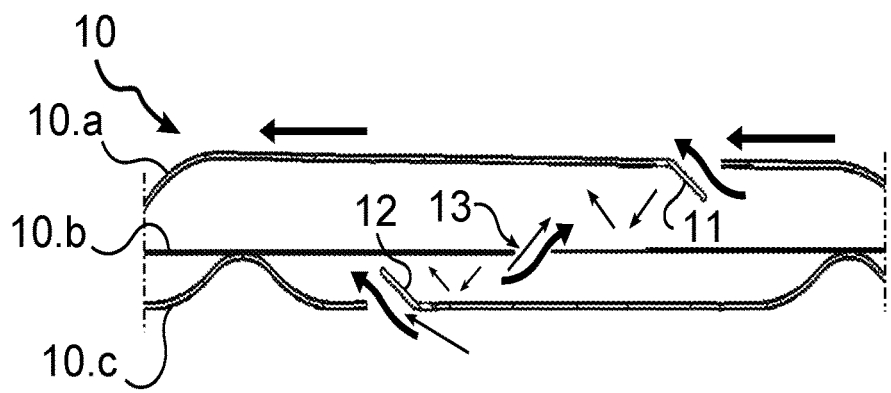
FIG. 4 is a view similar to the view of FIG. 3 showing a variant embodiment of the invention.

In a variant shown in FIG. 4, the scoops 11 and 12 may be open towards the inside of the heat screen instead of towards the outside of the heat screen. Naturally, it is possible to mix these two variants, e.g. providing for the outer sheet to have outwardly open scoops and the inner sheet to have inwardly open scoops.

Figure 5:
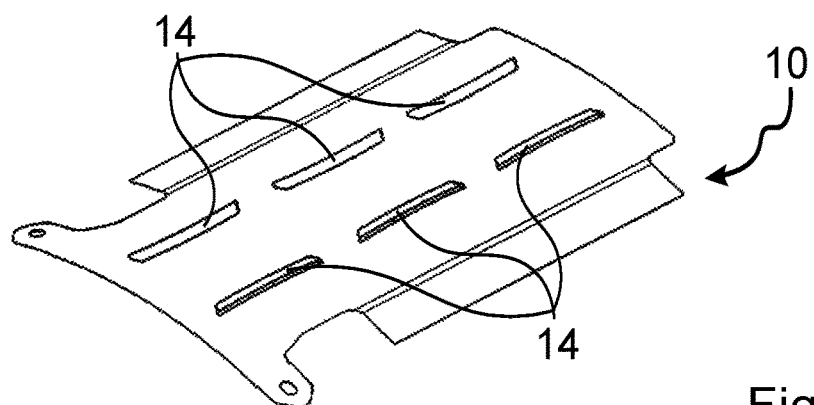
FIG. 5 is a perspective view of a heat screen petal provided with perforations in a second embodiment of the invention.

In a second embodiment, as shown in FIG. 5, the scoops 14 extend axially both in the outer sheet, as can be seen in the figure, and in the inner sheet, while still being offset. As above, associated orifices are made in the intermediate sheet between two scoops so as to co-operate with the scoops to form perforations allowing hot air to pass through the heat screen, with the intermediate sheet forming an obstacle blocking radiation from passing directly from the disks to the wheel. Indirect radiation that has been subjected to multiple reflections, and that is thus necessarily attenuated, may nevertheless pass through the perforations.

Under all circumstances, when the scoops allow pollution (external dust, carbon from the disks, . . . ) to penetrate into the inside of the heat screen, provision is made in the heat screen for discharge orifices that are regularly arranged so that when the wheels are being cleaned, cleaning liquid can easily remove and carry away the pollution, regardless of the angular position of the wheel.

Figure 6:
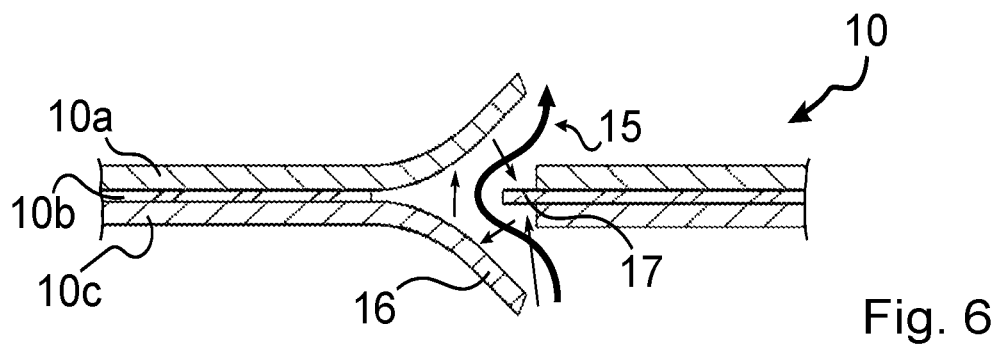
FIG. 6 is a longitudinal section view of a heat screen petal in a third embodiment of the invention.

In a third embodiment shown in FIG. 6, the heat screen 10 is provided with perforations at a location where the three sheets 10a, 10b, and 10c are contiguous. Superposed scoops 15 and 16 are made in the outer and inner sheets 10a and 10b so as to open towards the same side, while the intermediate sheet 10b is pierced between the scoops 15 and 16, so as to leave a portion 17 of the intermediate sheet that extends facing the openings of the scoops 15 and 16 so as to form an obstacle blocking any radiation from passing directly from the disks towards the wheel. Indirect radiation that has been subjected to multiple reflections, and that is therefore necessarily attenuated, may nevertheless pass through the perforations.

Figure 7A:
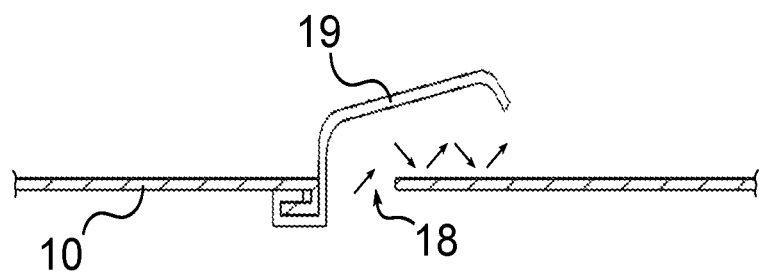
FIGS. 7a to 7c are longitudinal section views of heat screen petals in several variants of a fourth embodiment of the invention.
Figure 7B:
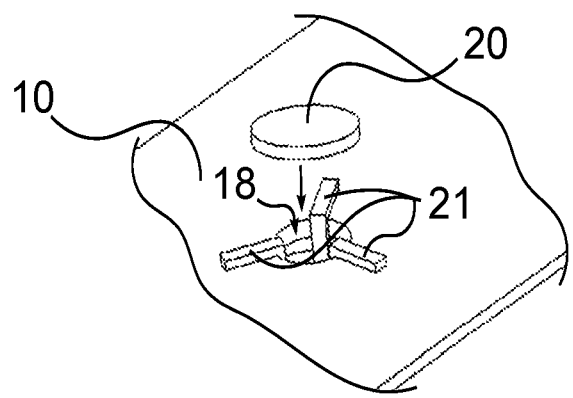
Figure 7C:
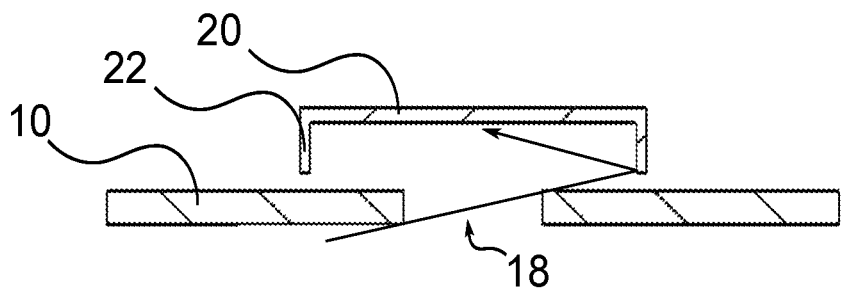

In a fourth embodiment as shown in FIGS. 7a to 7c, perforations made in the heat screen, and the heat screen is provided with shields covering the perforations so as to block any radiation from passing directly from the disks towards the wheel, while still leaving openings for passing hot air. The examples shown relate to single-sheet heat screens. However, if the heat screen has a plurality of sheets, the shield should preferably be fastened to the outer sheet.

As can be seen in FIG. 7a, the sheet constituting the heat screen 10 has a perforation 18 for allowing air heated by the disks to pass to the outside, but the perforation is provided with a shield 19 that is fitted to the heat screen so as to project from an outer face thereof. The shield 19, which is fastened by folding in this example, covers the perforation 18 so as to form an obstacle blocking any radiation from passing directly from the disks towards the wheel, while allowing an opening to remain for passing air. In this example, the shield 19 extends well beyond the perforation so as to encourage repeated reflections of radiation passing through the perforation between the shield 18 and the outside face of the heat screen, in order to attenuate its intensity.

FIG. 7b shows a variant of a shield 20 that covers a perforation in the heat screen 10 by being fitted on fastener tabs 21 that are fastened to the heat screen 10 at the perforation. As shown in FIG. 7c, the shield 20 advantageously has a peripheral dropped edge 22 for limiting the passage of radiation towards the wheel.

The invention is not limited to the above description, but on the contrary covers any variant coming within the ambit defined by the claims.

The invention claimed is:

1. A method of reducing the cooling time for disks of a brake (5) of an aircraft wheel (1) mounted to rotate on aircraft landing gear about an axis of rotation, and fitted with a heat screen (10) extending, when looking in a direction perpendicular to the axis of rotation, between the disks of the brake and an inner surface of the wheel directly opposite said disks of the brake, the method comprising:
    making perforations (11, 12, 13; 15, 16, 17, 18) through the heat screen, and
    providing the perforations with obstacles so that, once the heat screen is in position between the disks of the brake and said inner surface of the wheel opposite said disks of the brake, the perforations allow air heated by the disks to pass through the heat screen towards the wheel and obstacles block any radiation from passing directly from the disks towards the wheel.

2. The method according to claim 1, wherein the perforation is covered by a shield (19; 20) projecting from an outer face of the heat screen, and forming an obstacle blocking any radiation from passing directly from the disks towards the wheel, while leaving an opening for passing air.

3. The method according to claim 2, wherein the shield (19) is secured to the heat screen by folding.

4. The method according to claim 2, wherein the shield (20) is secured to the heat screen by fastener tabs (21) extending from the perforation that is covered by the shield.

5. The method according to claim 4, wherein the shield has a peripheral dropped edge (22).

6. A heat screen including perforations arranged and shaped to perform the method according to claim 1.

7. A method of reducing the cooling time for disks of a brake (5) of an aircraft wheel (1) fitted with a heat screen (10) extending between the wheel and the disks of the brake, and mounted to rotate on aircraft landing gear about an axis of rotation, the method comprising
    making perforations (11, 12, 13; 15, 16, 17, 18) through the heat screen to allow air heated by the disks to pass through the heat screen towards the wheel, the perforations being provided with obstacles to block any radiation from passing directly from the disks towards the wheel,
    wherein the heat screen comprises an outer sheet (10a), an intermediate sheet (10b), and an inner sheet (10c), offset scoops (11, 12) being formed in the outer and inner sheets, and an orifice (13) being formed in the intermediate sheet between the scoops, the intermediate sheet forming the obstacle that blocks direct radiation.

8. The method according to claim 7, wherein the scoops (11, 12) extend perpendicularly to an axial direction.

9. The method according to claim 7, wherein the scoops (14) extend axially.

10. A method of reducing the cooling time for disks of a brake (5) of an aircraft wheel (1) fitted with a heat screen (10) extending between the wheel and the disks of the brake, and mounted to rotate on aircraft landing gear about an axis of rotation, the method comprising
    making perforations (11, 12, 13; 15, 16, 17, 18) through the heat screen to allow air heated by the disks to pass through the heat screen towards the wheel, the perforations being provided with obstacles to block any radiation from passing directly from the disks towards the wheel,
    wherein the heat screen comprises an outer sheet (10a), an intermediate sheet (10b), and an inner sheet (10c), superposed scoops (15, 16) that are open towards the same side being formed in the outer and inner sheets at locations of the heat screen where the sheets are contiguous, while the intermediate sheet (10*b*) is pierced between the scoops (15, 16) to leave a portion (17) of the intermediate sheet facing the openings of the scoops so as to form the obstacle blocking direct radiation.

\* \* \* \* \*